May 29, 1956  M. W. SULLIVAN  2,747,298
EDUCATIONAL AND AMUSEMENT DEVICE
Filed June 15, 1954

INVENTOR
MARY W. SULLIVAN.

ATTORNEY

United States Patent Office 2,747,298
Patented May 29, 1956

2,747,298

EDUCATIONAL AND AMUSEMENT DEVICE

Mary W. Sullivan, Freeport, N. Y.

Application June 15, 1954, Serial No. 436,840

2 Claims. (Cl. 35—26)

This invention relates to an educational and amusement device which is designed to present a complete pictorial representation at the expenditure of a limited amount of skill and ingenuity.

The primary object of the invention is to provide an attractive amusement device especially for children from three to four years of age up through primary school age that has an added educational factor, although the device has an amusement value even for adults.

Another object of the invention is to not only appeal to the natural curiosity to see the pictorial representation resulting from using the device but also the color factor used as a guide for the line filling means as applied to the partially delineated pattern assists in teaching comparative colors.

A further object of the invention is to provide a very economically manufactured device of this character that utilizes readily available elements to accomplish the desired result.

These and other objects of the present invention will appear as the following description thereof proceeds, and in order to more clearly understand the invention, reference may be made to the accompanying drawings in which.

In the invention as disclosed there is provided a base 1 which is formed of any suitable material such as cardboard or some stiffened paper. It may be used as a unit or may be a page of a pad or book. Upon the surface of the base 1 is delineated a pattern in incomplete form of any pictorial representation or design. This pattern is delineated by a plurality of spaced markers or dashes 2 which are characterized by being of different colors such as red, green, blue, etc. The choice and use of the colored markers is optional with the artist delineating the pattern. The color arrangement may or may not harmonize with the ultimate complete pictorial representation, picture or design resulting, but the use of multiple different colors is essential.

Figure 3:
Figure 3 is a perspective view of one type of line filler element that may be used with the device.

To provide a means for filling in the lines to result in the creation of the pictorial representation there is provided multiple short sticks in the nature of a toothpick or a wooden match stem 3, one type of which is shown in Figure 3. These short sticks or line fillers are also colored red, green, blue, etc.

Figure 1:
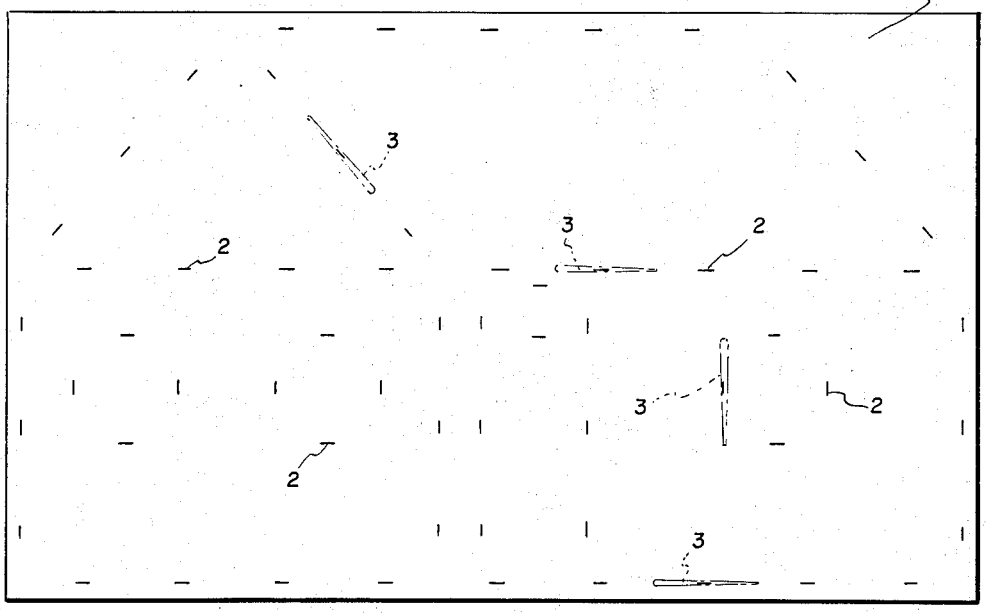
Figure 1 is a plan view of the base of the device with the spaced markers of the pattern delineated thereon and a few of the line filling elements shown in dotted lines.
Figure 2:
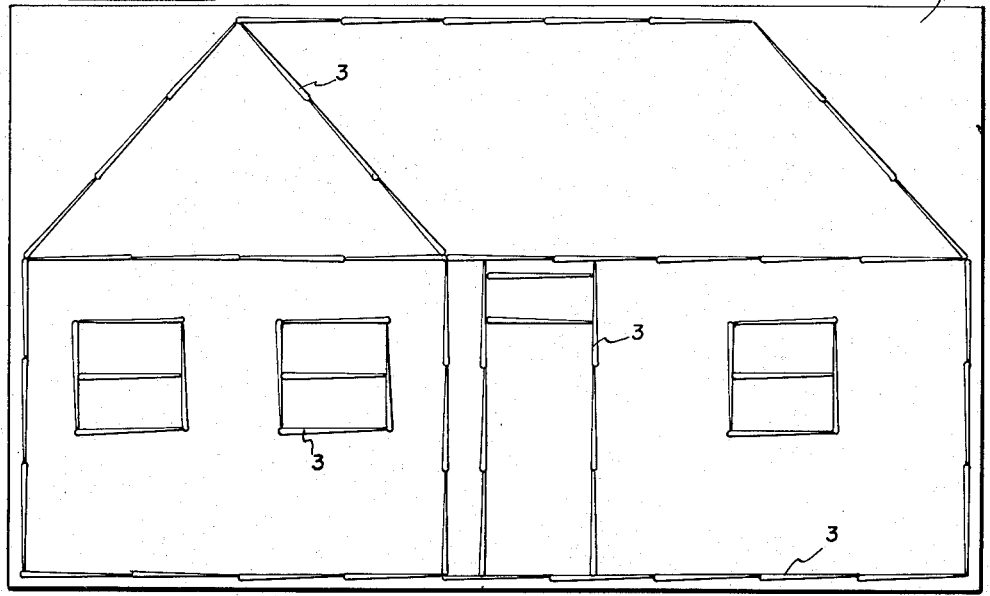
Figure 2 is a similar view with the pictorial representation completed.

In use the child is provided with a base 1 with the predetermined pattern delineated by the spaced markers or dashes 2 arranged thereon and also a plurality of short colored sticks 3 in the instance shown, colored toothpicks. The child then selects a stick and lays it lengthwise on a correspondingly colored marker or dash 2 of the pattern. The stick is laid lengthwise of the marker 2 and the intermediate portion of the stick covers the marker. The sticks are eventually laid in end relationship and when all markers are covered the result is a complete pictorial representation, an example of which is shown in Figure 2, which is a completion of the pattern depicted in Figure 1. The pattern may be varied endlessly and many forms of pictures, designs or even scenes result upon the completion of the laying of the line filling sticks.

Obviously this device may be very economically manufactured and the range of resulting pictorial representations is vast. The requirement that sticks 3 be applied to correspondingly colored markers increases the educational value of the device as well as adding to the attractiveness of the resulting picture or design.

Although the improved educational and amusement device has been illustrated and described herein to a detailed extent, it will be understood, of course, that the invention is not to be regarded as limited correspondingly in scope, but includes all variations coming within the terms of the appended claims.

I claim:

1. An educational and amusement device including a base, a plurality of spaced straight line markers delineated thereon in a predetermined pattern, and individual line filling means in the nature of small sticks longer than the markers alined on each individual marker to complete a pictorial representation delineated by the pattern.

2. An educational and amusement device including a base, a plurality of spaced straight line different colored dashes delineated thereon in a predetermined pattern, a plurality of short relatively thin different colored sticks longer than the dashes adapted to be placed on correspondingly colored dashes to complete a pictorial representation delineated by the pattern, and each stick being placed lengthwise on the corresponding dash at its intermediate portion.

References Cited in the file of this patent

UNITED STATES PATENTS

| | | |
|---|---|---|
| 658,083 | Favour | Sept. 18, 1900 |
| 1,213,690 | Quinones | Jan. 23, 1917 |
| 1,327,907 | Currie | Jan. 13, 1920 |
| 1,388,505 | Bamforth | Aug. 23, 1921 |
| 2,280,609 | Williamson | Apr. 21, 1942 |